United States Patent [19]
Cline

[11] Patent Number: 5,490,398
[45] Date of Patent: Feb. 13, 1996

[54] HIGH EFFICIENCY ABSORPTION COOLING AND HEATING APPARATUS AND METHOD

[75] Inventor: Calvin D. Cline, Weatherford, Tex.

[73] Assignee: Airex Research and Development, Inc., Weatherford, Tex.

[21] Appl. No.: 233,304

[22] Filed: Apr. 26, 1994

Related U.S. Application Data

[63] Continuation-in-part of Ser. No. 31,664, Mar. 15, 1993, abandoned.

[51] Int. Cl.[6] .............................. F25B 33/00; F25B 15/00
[52] U.S. Cl. .................................. 62/497; 62/495; 62/101
[58] Field of Search ................................ 62/476, 495, 497, 62/101

[56] References Cited

U.S. PATENT DOCUMENTS

| | | | |
|---|---|---|---|
| 3,105,363 | 10/1963 | Von Der Scher | 62/148 |
| 3,177,677 | 4/1965 | Boren et al. | 62/236 |
| 3,381,520 | 6/1971 | Quesada | 62/476 |
| 3,585,810 | 6/1971 | Sander | 62/144 |
| 4,165,455 | 8/1979 | Mayfield | 219/10.55 A |
| 4,310,739 | 1/1982 | Hatem | 219/10.55 A |
| 4,313,739 | 2/1982 | Douglas-Hamilton | 55/2 |
| 4,362,025 | 12/1982 | Theakston | 62/148 |
| 4,487,030 | 12/1984 | Carter et al. | 62/141 |
| 4,665,709 | 5/1987 | Perry | 62/141 |
| 4,682,476 | 7/1987 | Payre et al. | 62/480 |
| 4,695,358 | 9/1987 | Mizuno et al. | 204/174 |
| 4,914,919 | 4/1990 | Walfridson et al. | 62/236 |
| 5,056,593 | 10/1991 | Hull | 165/111 |
| 5,179,259 | 1/1993 | Martin | 219/10.55 A |

*Primary Examiner*—Henry A. Bennett
*Assistant Examiner*—William C. Doerrler
*Attorney, Agent, or Firm*—Charles D. Gunter, Jr.

[57] ABSTRACT

An absorption heating and cooling system is shown in which an absorbent/refrigerant fluid is circulated in a fluid flow loop having a condenser, a metering device, an evaporator, an absorber and a generator chamber. A magnetron provides a heat source for the generator chamber which also contains electrodes to facilitate vaporization of the refrigerant. The vaporized refrigerant and entrained moisture passes from the generator chamber to an electromagnetic vapor scrubber to further ionize the fluid. The ionized fluid passes from the scrubber to the condenser and from the condenser through a metering device which reduces the pressure and temperature of the fluid. The refrigerant then passes to an evaporator where it contacts a heat exchange medium which transfers heat to the refrigerant in order to achieve a desired cooling effect. The refrigerant then passes from the evaporator to the absorber and back to the generator chamber to repeat the cycle.

9 Claims, 4 Drawing Sheets

HIGH EFFICIENCY ABSORPTION COOLING AND HEATING APPARATUS AND METHOD

CROSS-REFERENCE TO RELATED APPLICATION

This application is a continuation-in-part of my earlier filed application, Ser. No. 08/031,664, filed Mar. 15, 1993, entitled "Magnatron Absorption Refrigeration System and Method Therefor." now abandoned.

BACKGROUND OF THE INVENTION

1. Field of the Invention

This invention relates generally to absorption heating and cooling systems and methods and, particularly, to a high efficiency absorption heating and cooling system and method utilizing a microwave energy heat source.

2. Description of the Prior Art

Closed loop absorption refrigeration systems are known in the prior art having at least a condenser, a metering device, an evaporator, an absorber, a pump and a generator or reaction chamber, typically fired by fossil fuels or electrical energy.

The principles of the prior art absorption refrigeration systems are similar in many respects to typical compression type refrigeration systems. In the classic compression type refrigeration system, a refrigerant is alternately compressed and expanded. In a simple closed loop compression type refrigeration system, there is at least a compressor, an evaporator, a throttling or metering device, and a condenser. During one stage of the compression type refrigeration cycle, a low pressure refrigerant vapor enters the compressor. At this point in the cycle, work is required of the compressor in order to raise the pressure and the boiling point of the refrigerant vapor. In the next phase of the compression type refrigeration cycle, the high pressure, high temperature refrigerant vapor leaving the compressor is transferred through a heat exchanger called a condenser. A second fluid passes through the condenser in order to remove heat from the refrigerant vapor, thereby transforming the refrigerant vapor to a refrigerant liquid. As the refrigerant liquid exits the condenser, it leaves at the same pressure but at a lower temperature than it had upon entering the condenser.

Next, the refrigerant passes through a throttling device that reduces the pressure, temperature and boiling point of the fluid. In the last step of the typical compression type refrigeration cycle, refrigerant travels through an evaporator to receive heat from some other fluid in communication with the evaporator to achieve the desired cooling effect of this other fluid. Such a closed loop compression refrigeration cycle is duplicated in order to repetitively remove heat from a body of fluid in communication with the evaporator.

Absorption type refrigeration systems accomplish cooling effects in a comparable manner to that described for the typical compression type refrigeration system. The evaporator, condenser and the throttling device are substantially similar in the two systems. However, a major distinction between the two systems is in the method used to increase refrigerant pressure between the condenser and the evaporator. In the compression type system, the increase in pressure is accomplished by a mechanical means, namely the compressor. In the absorption type system, the increase in pressure is brought about by means of heating an absorbent/refrigerant fluid, such as a water/ammonia mixture. The absorption refrigeration system is based upon the phenomenon of the absorption of ammonia vapor by water at lower temperatures and the expulsion of ammonia vapor when the water/ammonia mixture is heated.

The absorption refrigeration system has certain advantages over compression type refrigeration systems. For example, the typical compressor used in compression type systems has a number of moving mechanical parts and is somewhat noisy. The absorption refrigeration system, lacking the compressor, significantly reduces the noise level of the system. Maintenance requirements are also reduced, since there are no moving compressor parts to wear out or require regular maintenance.

In the past, the primary heat source for the generator used in the absorption type refrigeration system was usually provided by steam, gas burners, or electric resistance heaters. For example, U.S. Pat. No. 4,914,919 shows an absorption refrigeration system operated by a heating cartridge from at least one electric current source or by a gas burner. Similarly, U.S. Pat. No. 4,487,030 shows another absorption refrigeration system which is operated by electrical resistance heaters or by flammable gas burners.

The practical use of these prior art absorption refrigeration systems was significantly limited due to several disadvantages associated with the heat source used by the generator of these and other comparable systems. In particular, the overall system efficiency of most of these prior art systems which used relatively inefficient generator heat sources was appropriately low in comparison to the system efficiency of most non-absorption type refrigeration systems. In addition, most of the heating sources used by the generator in these prior art absorption systems required frequent and costly maintenance.

A need exists to provide an absorption refrigeration system having a high efficiency and a low maintenance heat source for use in the system generator or reaction chamber which increases the overall thermal efficiency of the system while decreasing the amount of routine maintenance which must be performed on this component of the absorption refrigeration system.

A need also exists for an absorption refrigeration system in which the refrigerant vapor is extracted from the absorbent/refrigerant mixture at the lowest possible temperature while achieving a high purity vapor.

A need also exists for an absorption refrigeration system which can be operated in a heating mode by changing the flow path of the absorbent/refrigerant fluid in the system.

A need also exists to provide an absorption refrigeration system which is more thermally efficient and yet which is cost effective and competitive with existing compression refrigeration systems in price.

The foregoing needs present in the prior art absorption refrigeration systems are met, in part, according to the teachings of the present invention by replacing the generator heat source of the prior art systems with a microwave energy source to heat the liquid absorbent/refrigerant mixture in the generator or reaction chamber. These needs are further met by electrolyzing the absorbent/refrigerant mixture in the generator chamber by subjecting the mixture to an ionizing current in addition to the microwave energy source. These needs are also met by passing the absorbent/refrigerant mixture from the generator chamber through an electromagnetic vapor scrubber to further ionize the fluid and extract the refrigerant vapor from the absorbent at the lowest possible temperature while achieving a high purity vapor.

The absorption refrigeration system of the invention then becomes a more thermally efficient, cost effective and low maintenance system.

SUMMARY OF THE INVENTION

One object of the present invention is to provide a high efficiency absorption refrigeration system and method.

Another object of the present invention is to provide a high efficiency absorption refrigeration system and method utilizing a refrigerant which will not deplete ozone in the atmosphere.

Another object of the invention is to provide a high efficiency absorption refrigeration system and method that is cost effective and low in maintenance.

Another object of the invention is to provide a high efficiency absorption refrigeration system and method utilizing a heat source provided by microwave energy to increase the temperature of the absorbent/refrigerant fluid.

Another object is to provide an electromagnetic scrubber means which assists the generator in extracting refrigerant vapor from the absorbent/refrigerant mixture in order to further increase the efficiency of the system.

Another object is to provide an absorption refrigeration system which can be operated in a heating mode, in the nature of a heat pump.

The foregoing objects are accomplished in a first stage of the system of the invention by bringing the absorbent refrigerant mixture (ammonia/water) to a temperature at least to the boiling point of the refrigerant with a minimal amount of microwave energy. In the next stage of the inventive method, an electrolysis effect is created within the generator in order to cause the ammonia to be broken from solution utilizing the ionized state of the ammonia and ionized water. The resulting release of a latent heat of hydrolization assists the heat from the microwave energy source in vaporizing the ammonia. In the next stage of the inventive method, the vaporized ammonia, still containing small amounts of ionized water vapor, is passed to an electromagnetic scrubber which utilizes a magnetic field to act upon the lighter vapor ammonia to further purify and separate the ammonia vapor at a temperature much higher than standard convection heating methods would produce.

These objectives are accomplished in practice by circulating an absorbent/refrigerant fluid in a fluid flow loop containing at least a condenser, a metering device, an evaporator, an absorber, a scrubber and a generator chamber. The condenser, metering device, evaporator and absorber are conventional. However, a non-conventional microwave energy source is coupled to the generator chamber for providing a heat source to increase the temperature of the absorbent/refrigerant fluid being circulated in the fluid flow loop. The absorbent/refrigerant fluid in the generator chamber is also subjected to an ionizing current produced by electrodes mounted in the interior of the reaction chamber in addition to the microwave energy source. The refrigerant fluid which leaves the generator chamber passes through an electromagnetic vapor scrubber which further ionizes the fluid and produces a predominantly refrigerant portion of the absorbent/refrigerant fluid. The ionized refrigerant portion from the scrubber is passed to the condenser where it is converted to a liquid. The refrigerant portion then passes through a metering device and to the evaporator where a heat exchange medium transfers heat to the refrigerant portion in order to achieve a desired cooling effect upon the heat exchange medium in conventional fashion. The refrigerant portion from the evaporator is passed to the absorber which increases the concentration of refrigerant portion in the absorbent of the absorbent/refrigerant fluid. The absorbent/refrigerant fluid is then recirculated to the generator chamber to repeat the cycle.

In the description which follows, the absorbent is water and the refrigerant is ammonia although other known absorption mixtures could be utilized. In order to operate in a heating environment, the fluid will also typically include an antifreeze component, such as methyl alcohol. At least one magnetron type microwave energy source is coupled to the generator chamber for providing a microwave heat source to increase the temperature of the absorbent/refrigerant fluid. At least two electrodes are mounted in spaced-apart relation within the generator chamber in contact with the absorbent/refrigerant fluid and are energized with an electrical current in order to further facilitate the release the refrigerant vapor from the absorbent/refrigerant fluid. The fluid loop is provided with a pump means for moving the absorbent/refrigerant fluid around the fluid loop. The magnetron type device is mounted on an exterior surface of the generator chamber at an opening provided therein. The magnetron is mounted by means of a lens assembly which includes a frame which contains a glass lens, the assembly also having a wave guide which directs microwave energy emitted by the magnetron type device into the generator chamber.

By providing a reversing valve in the fluid flow loop downstream of the electromagnetic vapor scrubber, the direction of flow of the refrigerant fluid can be reversed, whereby hot vapor produced in the scrubber can be passed to the evaporator where a heat exchange medium receives heat from the hot vapor in order to achieve a desired heating effect upon the heat exchange medium.

Additional objects, features and advantages will be apparent in the written description which follows.

DETAILED DESCRIPTION OF THE INVENTION

Figure 1:
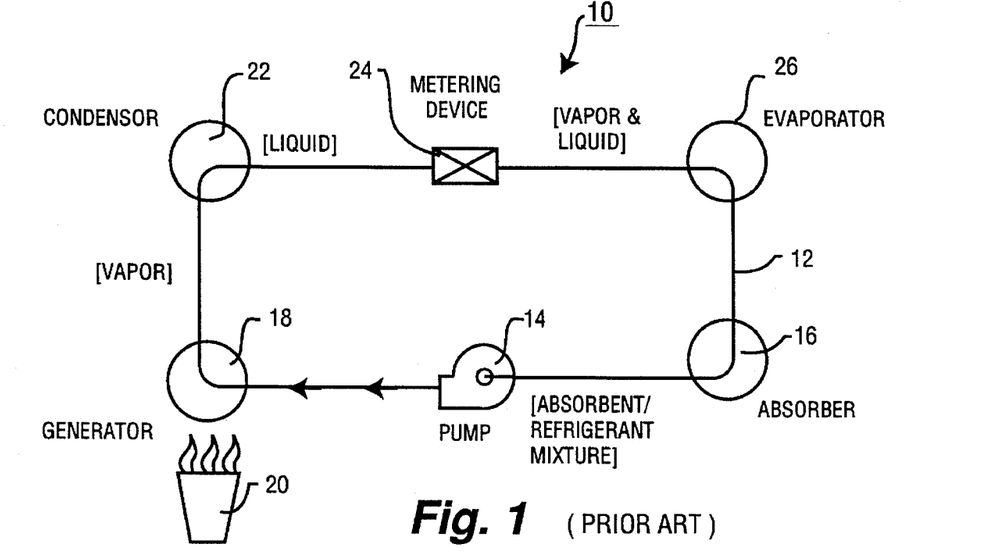
FIG. 1 is a simplified system block diagram representing the fundamental elements of the prior art absorption refrigeration system.

FIG. 1 shows a typical prior art absorption refrigeration system, in simplified fashion, designated generally by the numeral 10. A closed loop of piping 12 is provided to contain an absorbent/refrigerant fluid such as a water/ammonia mixture. In addition, a pump 14 is furnished to provide a motive force to drive the absorbent/refrigerant mixture around the closed loop 12 in a clockwise direction in this particular system diagram. In absorber 16, the temperature of the absorbent/refrigerant mixture is controlled to cause the absorption of the refrigerant by the absorbent. A generator chamber 18 contains a portion of the absorbent/refrigerant mixture while a heat source 20, such as a gas burner or an electrical resistance heating element, heats the absorbent/refrigerant mixture to drive off refrigerant vapor. A condenser 22 having a cooling source (not shown) is provided to condense the refrigerant vapor which enters the condenser 22 from the generator 18. The refrigerant fluid leaving condenser 22 is reduced in pressure by a metering device 24 before the refrigerant enters an evaporator 26. A heat exchange fluid medium (not shown) is in communication with the evaporator 26 so that this fluid transfers its heat to the refrigerant passing through the evaporator 26 to achieve a desired cooling effect.

Figure 2:
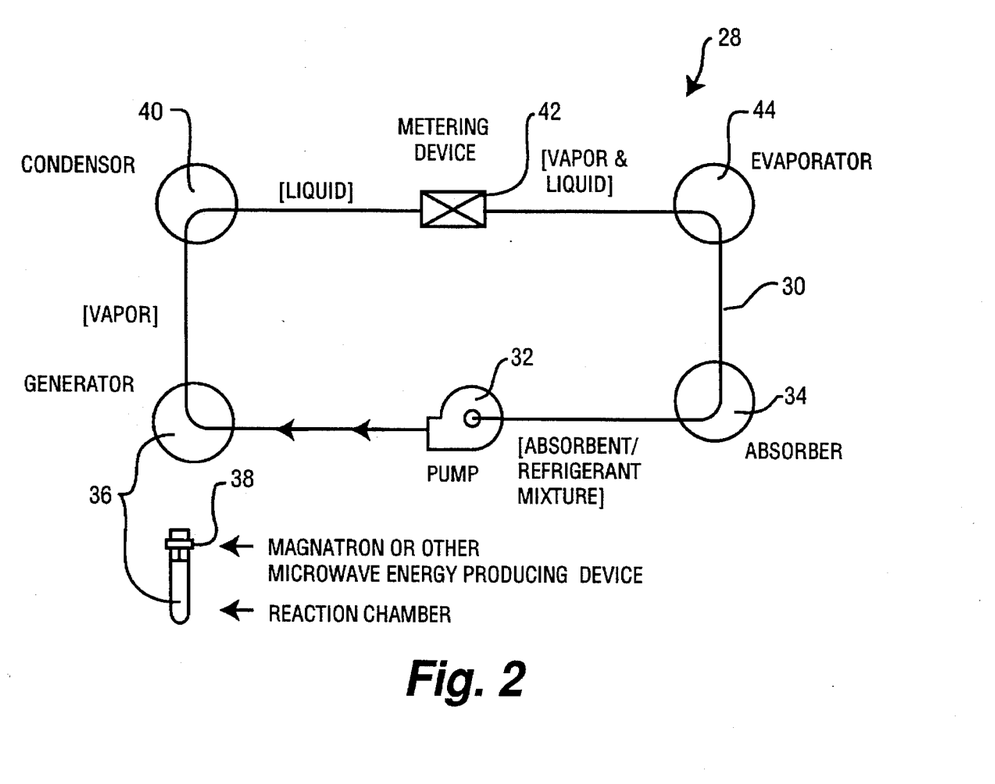
FIG. 2 is a system block diagram similar to FIG. 1 but showing the microwave energy source for the absorption generator of the system.

FIG. 2 is a simplified block diagram, similar to FIG. 1, illustrating a key feature of the absorption heating and cooling system of the invention, namely the microwave energy source. The system of FIG. 2, designated generally as 28, includes a closed loop of piping 30 which contains an absorbent/refrigerant mixture such as a water/ammonia mixture, or any other suitable absorbent refrigerant mixture. A pump 32 is furnished to provide a motive force to drive the absorbent/refrigerant mixture around the closed loop 30 in a clockwise direction. In a manner similar to that previously described, the absorber 34 controls the temperature of the absorbent/refrigerant mixture to cause the absorption of the refrigerant by the absorbent. A generator or reaction chamber 36 contains a portion of the absorbent/refrigerant mixture while a microwave energy heat source 38 is removably connected to the generator or reaction chamber 36 to provide microwave energy that heats the absorbent/refrigerant mixture, thereby driving off refrigerant vapor from the generator or reaction chamber 36. A condenser 40 having a cooling source that is not shown is provided to condense the refrigerant vapor which enters the condenser 40 from the generator or reaction chamber 36. The refrigerant fluid leaving the condenser 40 is reduced in pressure by metering device 42 before the refrigerant enters the evaporator 44. A heat exchange fluid medium (not shown) is in communication with the evaporator so that this fluid transfers its heat to the refrigerant passing through the evaporator to achieve the desired cooling effect.

Figure 3:
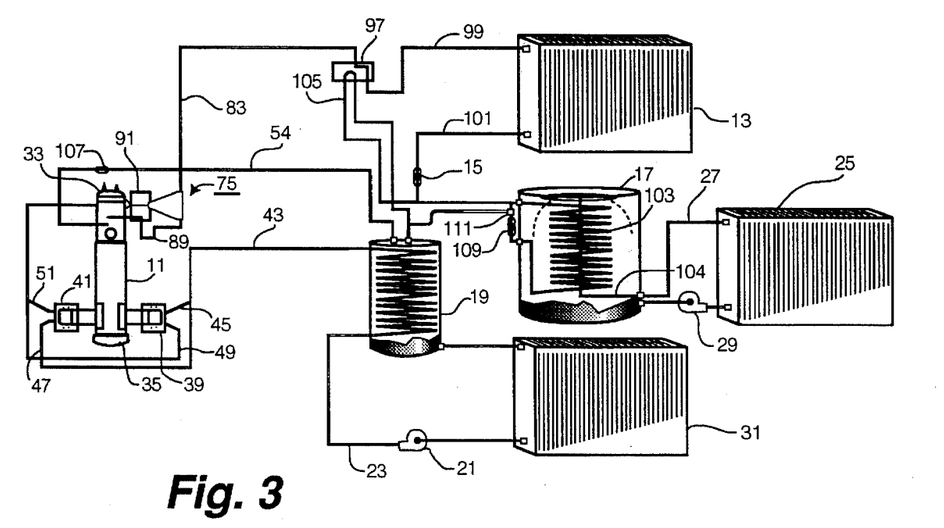
FIG. 3 is a schematic diagram of the components of the absorption heating and cooling system of the invention in the cooling mode.

FIG. 3 is a simplified, schematic representation of the components of the absorption heating and cooling system of the invention in the cooling mode. The system includes at least a generator chamber 11, a condenser 13, a metering device 15, an evaporator 17 and an absorber 19 which function generally as described with respect to FIG. 2. A positive displacement pump 21 is provided for moving an absorbent/refrigerant fluid in a fluid flow loop 23 connected therebetween. An inside heating and cooling coil 25 either receives heat from (in the cooling mode) or adds heat to (in the heating mode) a refrigerant medium flowing in a loop 27 and is circulated by means of a pump 29. Loop 27 is independent of loop 23 which circulates throughout the rest of the system. An optional solution cooling coil 31 is also shown in the preferred embodiment of FIG. 3.

Figure 5:
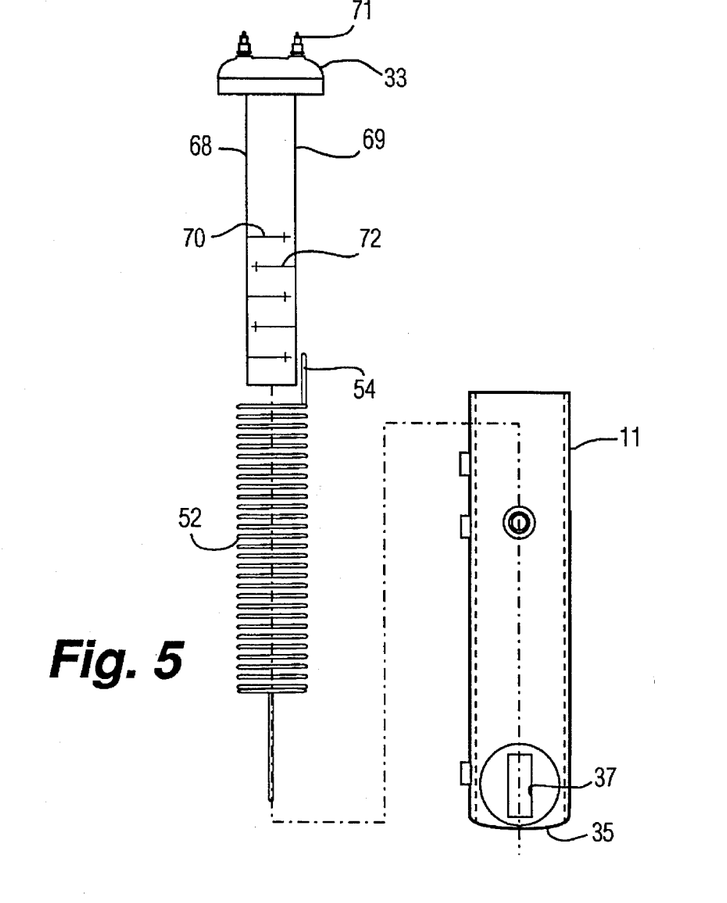
FIG. 5 is an isolated, exploded view of the main components of the generator chamber of the absorption refrigeration system of the invention.

FIG. 5 shows the generator chamber 11 in exploded fashion. The chamber 11 is a generally cylindrical steel chamber having upper and lower flanges 33, 35 and an initially open interior. The chamber 11 is also provided with a pair of diametrically opposed window openings (37 shown in FIG. 5) for receiving a microwave energy means which serves as a heat source to increase the temperature of the absorbent/refrigerant fluid being circulated in the fluid flow loop 23. A coil 52 is received within the chamber open interior and is connected to conduit 54 (FIG. 3) leading to the absorber 19, as will be described.

Figure 7:
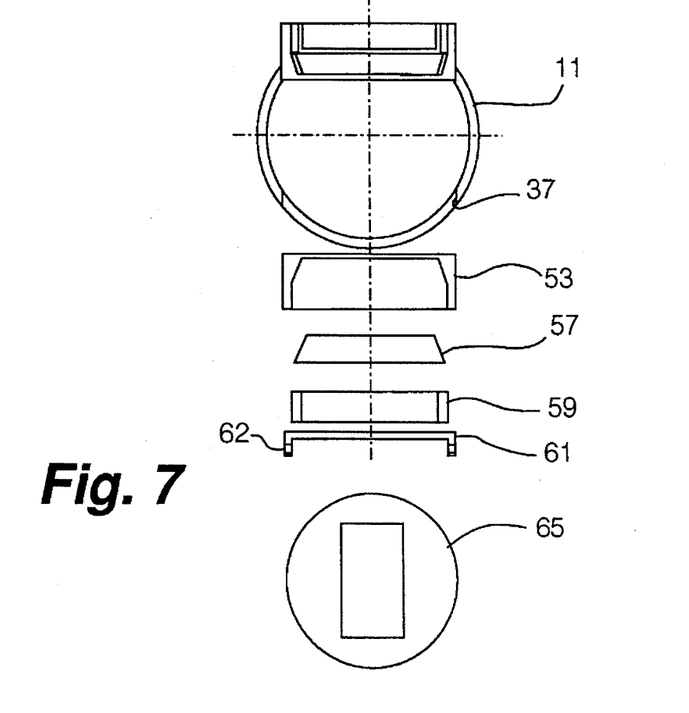
FIG. 7 is a top, sectional view of the reactor chamber showing the wave guide of the microwave energy source in exploded fashion.
Figure 8:
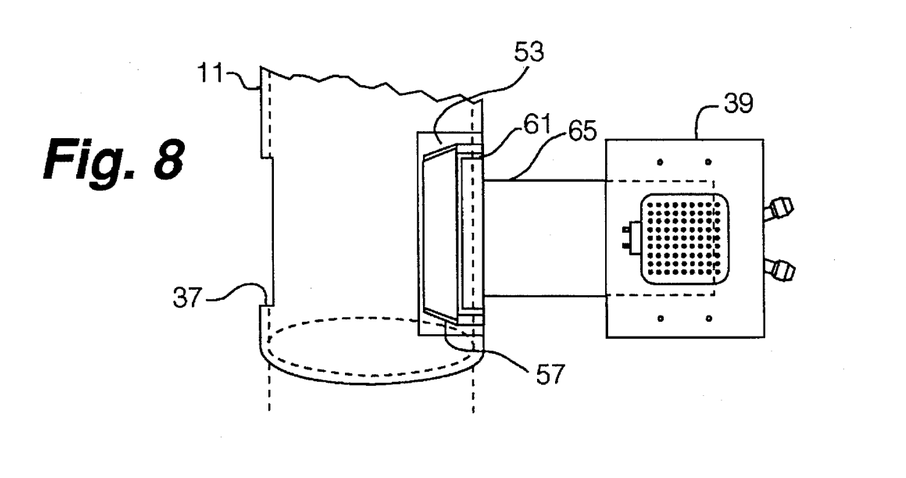
FIG. 8 is a side, partial view of the reactor chamber of FIG. 7 showing the mounting of the magnetron energy source to the wave guide.

As shown in greater detail in FIGS. 7 and 8, the microwave energy means is preferably at least two 1.4K magnetron type units such as those available from National Electronics Division of Richardson Electronics, Limited, LaFox, Ill. as the NL1.0254-7. Each magnetron (39, 41 in FIGS. 3 and 8) is preferably solution cooled by means of a refrigerant being circulated in the portion of the flow loop 43 (FIG. 3) from the absorber 19 and solution cooling coil 31. Each magnetron 39, 41 has a fluid inlet 45, 47 and a fluid outlet 49, 51 for circulating refrigerant.

As shown in FIGS. 7 and 8, each magnetron 39 is mounted by means of a wave guide assembly which includes a generally rectangular frame 53 welded to the generator chamber at the window opening 37. The wave guide assembly further includes, a glass lens 57, a lens locator or mounting 59, and a cover member 61. The lens 57 is preferably a round, pyrex member and is rated up to 450 psi internal pressure within the chamber. The cover member 61 is mounted within the frame 53 by means of set screws received in bores 62. The wave guide 65 (shown in planar fashion in FIG. 7) is affixed to the cover member 61, in any convenient fashion, with the microwave source aligned with the glass lens 57 of the assembly.

As shown in FIG. 5, an ionization means, such as electrodes 68, 69 are located within the generator chamber 11 for electrolyzing the absorbent/refrigerant fluid in the generator chamber by subjecting the fluid to an ionizing current in addition to the microwave heat source. Preferably, the two electrodes 68, 69 having alternating 4" discs 70, 72 attached in staggered fashion to increase the surface area available for the electrolysis effect. The discs 70, 72 extend downwardly within the interior of the reaction chamber generally parallel to the reactor bottom flange 35. The electrodes 69 are stainless steel rods which will not become magnetized and are held in place by mountings 71, the mountings being connected to a power source (not shown) for energizing the electrodes with an electrical current. The power means can be any convenient means, for example, a 12 volt automobile battery. As will be explained, the electrodes 68, in the embodiment shown are energized by one winding of the transformer used on the electromagnetic scrubber to provide approximately 27 watts of power, although any other convenient energy source could be utilized.

As will be explained in greater detail, the magnetron units 39, 41 are used to bring the absorbent/refrigerant liquid to a temperature at least at the boiling point of ammonia with a minimal amount of microwave energy. The electrodes 68, 69 are energized in order to cause the ammonia to be broken from solution utilizing the ionized state of ammonia and ionized water. It is theorized that this action causes a release of a latent heat of hydrolization. The free molecular energy which results is used in vaporizing the ammonia. This action assists in efficiently extracting ammonia from a solution at the lowest possible temperature while achieving a high purity vapor.

Vaporized ammonia, containing small amounts of ionized water vapor, passes from the reactor chamber 11 to an electromagnetic vapor scrubber, indicated generally as 75 in FIG. 3. The vapor scrubber 75 is shown in greater detail in FIG. 6. The scrubber 75 includes a conically shaped vapor chamber 79 which converges to a tubular flow passage 81 which is connected at an outer extent 93 to the upper region of the reactor chamber 11. The tubular flow passage 81 is formed of a plastic or resin material or non-carbon steel which will not become permanently magnetized. The chamber 79 has an outlet conduit 83 for passing vapor to the condenser coil 13 and has an outlet conduit 87 for conducting condensate through the conduit 89 (FIG. 3) back to the reaction chamber 11.

Figure 6:
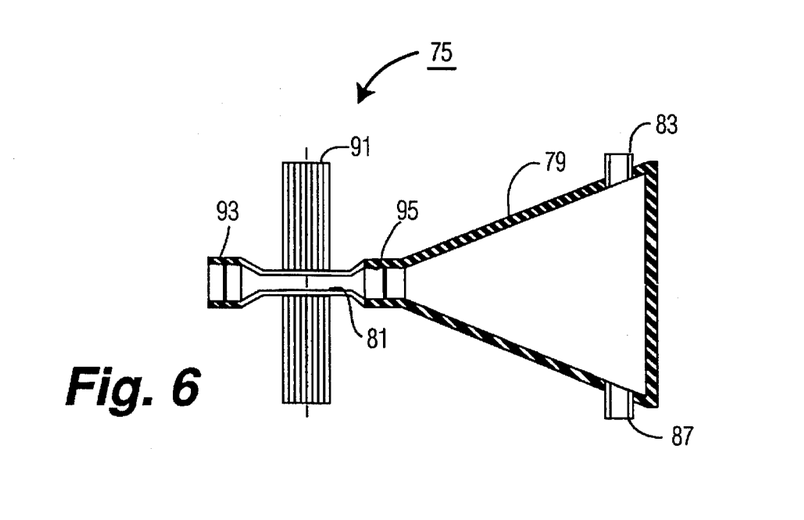
FIG. 6 is an isolated, cross-sectional view of the electromagnetic vapor scrubber component of the absorption heating and cooling system.

As shown in FIG. 6, the tubular flow passage 81 passes through the windings of a transformer 91 which is capable of establishing a 15,000 gauss electromagnetic flux field about the flow passage 81. The transformer preferably has three windings (not shown), a primary winding for the supply voltage (120 volts); a secondary winding to supply voltage for the electrodes 68, 69 (27 volts); and a third winding to test the gauss of the magnetic field established about the tubular flow passage 81 (18.12 volts).

An optional pair of radiation rings 93, 95 are located on each end of the tubular flow passage 81. Each ring contains a radioactive source, similar to that found in a home smoke detector to facilitate the vaporization of ammonia in the unit. The fluid entering the outer extent 93 still contains small amounts of ionized water vapor. Nuclear magnetic resonation fields created by the rings 93, 95 are used to act upon the lighter vapor ammonia by exciting the electrons in the outer valence rings. It is theorized that by isolating the magnetic effect strictly to the ammonia and it being subjected to severe magnetic fields, energy will be added to the atoms, adding heat and causing further vaporization at a temperature much higher than standard convention heating methods. The scrubber 75 thus acts in the nature of a gravity operated rectifier to separate vapor passing out conduit 83 from condensate passing out conduit 87.

After being further vaporized and purified in the vapor scrubber 75 (FIG. 3), the ammonia vapor passes out conduit 83 (hot dry vapor line) and through a solenoid operated reversing valve 97 to inlet conduit 99 of the condenser 13. The condenser operates as previously described in that the refrigerant vapor is condensed by a cooling fluid in communication with the condenser unit.

From this point forward, the system components function in conventional fashion. The condensed fluid (high pressure liquid) passes out conduit 101 and through a metering device 15 which throttles the refrigerant leaving the condenser in order to reduce the pressure of the refrigerant vapor and liquid mixture before it enters the evaporator 17. In the cooling mode, the valve 15 allows flow only in the direction of the evaporator 17. Note that a heat exchange effect is also achieved in conduit 101 in that portion thereof which surrounds conduit 105 exiting the evaporator 17. The refrigerant then passes through the coils 103 through the by-pass valve 111 and through conduit 105 to the absorber 19. The refrigerant in the coils of evaporator 17 receives heat from the heat exchange medium (e.g. a glycol-water solution) being circulated in the conduit 27 from the cooling unit 25 located, for example within a dwelling structure, to create the preferred cooling effect. The heat exchange medium is pumped in a closed loop 27, through conduit 104 and cascades downwardly within the interior of the evaporator 17 before being returned to the cooling unit 25. In the absorber 19, the temperature of the absorbent/refrigerant fluid is maintained relatively low by means of the solution cooling coil 31, cooled by an air blower (not shown), and fluid being circulated through the conduit 23, in order to increase the absorption of the refrigerant by the absorbent fluid. The coolest strong solution of absorbent/refrigerant exits conduit 43 and is returned to the chamber 11. Hot, weak solution is forced by pressure from the chamber 11 through restrictor 107 and conduit 54 to the absorber. The restrictor 107 meters the amount of weak solution at an equal rate to the rate at which vapor is evaporated from chamber 11.

Figure 4:
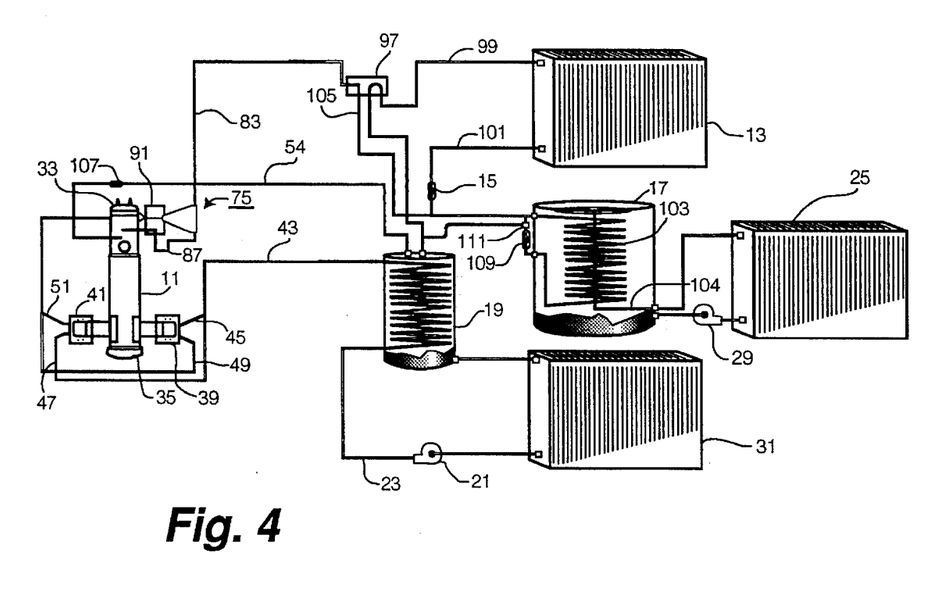
FIG. 4 is a schematic diagram, similar to FIG. 3, showing the absorption heating and cooling system in the heating mode.

In the heating mode of the system, illustrated in FIG. 4, the components of the system operate as previously described, with the exception that a solenoid operated reversing valve 97 passes the hot discharge vapor from the scrubber 75 to the evaporator 17, through conduit 105, so that the evaporator 17 now functions as the condenser and so that the condenser 13 now performs the function of an evaporator coil. Solution restrictor check valve 109 moves off its seat in the heating mode and allows fluid flow without being metered. Restrictor 15 remains seated and meters solution to change the solution pressure as it enters the unit 13. As will be explained in the examples which follow, a hot gas bypass valve 111 is provided for use in a defrost cycle of the system. In this mode of operation, the reversing valve is in the cooling position with the exception that condensed ammonia will bypass the evaporator 17 by passing through valve 111 to avoid taking heat from the solution heating the dwelling. One of the pair of magnetrons is energized to heat the absorbent while defrost of the system is achieved.

The following examples are intended to be illustrative of the invention without being limiting thereof:

Cooling Cycle Reversing Valve On (1) Start up-Solution pump will start and run 2 minutes to allow solution cooled magnetron on the generator to cool.

(2) Two 1.4 KW magnetrons come on line to heat the ammonia solution (20 lbs. ammonia/25 lbs. water) to a 300° F. maximum temperature in approximately 10 minutes.

(3) At that temperature, the operation of one magnetron will stage out.

(4) Two electrodes (approximately 27 watts) and a vapor scrubber are energized, operating with approximately 5% less energy than 1.4 KW magnetron.

(5) The vapor scrubber is wound with three windings:
  (1) Primary for supply voltage (120 volts);
  (2) A secondary winding to supply voltage for electrodes (13.5 volts); and
  (3) Another winding to test gauss of magnetic field passing through the scrubber tubular flow passage (18.12 volts).

(6) Through the combined use of electrolysis and the magnetic vapor scrubber, ammonia gas is separated from the solution using less power while exciting the ammonia vapor with the vapor scrubber's magnetic field, (18,120 gauss) effectively removing moisture without a reduction in temperature of the gas, thereby increasing the efficiency of the operation. The generator temperature may tend to decrease to 240° F.

(7) The vapor scrubber and electrodes will drop out of operation and the second magnetron will come on line to raise the temperature back to 280° F. This will take approximately 5 minutes.

(8) At this temperature the electrodes and vapor scrubber will come back on line and the #2 magnetron is taken out. The magnetrons will continue to cycle on and off to keep the heat exchange medium in the cooling unit reduced to 40° F.

A prototype unit has been operated with 95° ambient temp, gen temp 280°, ammonia cond temp 130° F. at 300 P.S.I.G., evap temp 38° F. 58 P.S.I.G., BTU rating indoor air flow 1,200 cfm, inlet water at 7.2 gal. per minute to the indoor coil 40° F., outlet water indoor coil 44° F., indoor enter air 78° F., 65° wet bulb reading, supply air 57° with a BTU rating of 36,000 BTU nominal cooling.

The ammonia solution used in the example was mixed as follows at lowest expected operating temperature: (This is not ambient temp., but it is evaporative operating temperature i.e. the temperature at which the ammonia boils in the evaporator unit.)

| Evap temp | % Methyl Alcohol |
| --- | --- |
| 25° | 10% |
| 15° | 20% |
| 3° | 30% |
| 0° | 33% |
| −5° | 35% |
| −13° | 40% |
| −24° | 45% |

EXAMPLE

Solution set for system to operate at lowest expected temperature of 25° F. Solution mixture is as follows:

In 20 qts. (5 gal. or 45 lbs.) of water mix add 1 lb. sodium hydroxide and 10% (2 qts.) methyl alcohol. Withdraw 25 lbs. of solution and put in drum add 20 lbs. of anhydrous ammonia to drum.

Heating Cycle Reversing Valve is Not Energized

All the functions are the same with the following exceptions:

(1) The flow of ammonia hot vapor is reversed by the three way, solenoid operated reversing valve;

(2) The evaporator 17 is now being used as a boiler vessel; and (3) The condenser coil is now in the evaporator section.

The continued operation of the heating system is as follows:

(4) Two 1.4 KW magnetrons on the generator will stay on line to maintain a 300° F. maximum temperature of the solution. Ammonia vapor will be condensed in the boiler tank cooled by Glycal solution. The vapor temperature is 240° F. The Glycal solution is heated to 160° F. At that temperature, the magnetron system will cycle off. As the temperature falls to 140° F., the magnetron system is again activated. Liquid ammonia will then flow to the evaporator through the metering device and vaporize to absorb heat from the outside air.

(5) Magnetrons can be installed on the boiler tank for make up heat in cold ambient temperature conditions, and defrost situations. (The number or size of magnetrons will vary with the structure and climate zone.) The previously described 36,000 BTU Cooling System/28,000 BTU Heating System will cool and heat a 1600 square foot dwelling with R-13 walls and R-24 Ceilings at 100° ambient temperature in the air conditioning mode and 35° ambient temperature in the heating mode without make up heat.

(6) The defrost cycle make use of the hot gas bypass valve (111 in FIG. 4). The reversing valve 97 puts the system in the previously described cooling mode with the exception that the condensed ammonia will bypass the unit 17 to avoid taking heat from the solution heating the dwelling. One magnetron will be energized to heat the water while defrost is achieved.

The solution that heats the dwelling should have an anti-freeze content as follows:

| Lowest Temp. | Anti-Freeze by Volume. |
| --- | --- |
| 25° | 10% |
| 15° | 20% |
| 3° | 30% |
| 0° | 33% |
| −5° | 35% |
| −13° | 40% |
| −24° | 45% |

An invention has been provided with several advantages. The absorptive heating and cooling system of the invention is simple in design and utilizes primarily commercially available parts. The microwave energy/electrolysis operated generator of the system provides a more efficient vaporization stage than did the prior art devices. There is no noisy compressor having mechanical parts which would tend to wear and require replacement or maintenance. The vaporization stages of the system are more efficient and economical than the prior art. The overall system efficiency of the absorption system of the invention compares favorably with non-absorption type heating and cooling systems. The principles of the invention increase the overall thermal efficiency of the system while decreasing the amount of routine maintenance which must be performed.

While the invention has been shown in only two of its forms, it is not thus limited but is susceptible to various changes and modifications without departing from the spirit thereof.

What is claimed is:

1. A method for providing a high efficiency absorption refrigeration system comprising the steps of:

circulating an absorbent/refrigerant fluid in a fluid flow loop containing at least a condenser, a metering device, an evaporator, an absorber and a generator chamber;

coupling a microwave energy source comprising at least one magnetron to the generator chamber for providing a heat source to increase the temperature of the absorbent/refrigerant fluid being circulated in the fluid flow loop, thereby releasing refrigerant vapor from the absorbent/refrigerant fluid;

subjecting the absorbent/refrigerant fluid in the generator chamber to an ionizing current in addition to the microwave energy source in order to further facilitate the release of refrigerant vapor from the absorbent/refrigerant fluid within the generator chamber;

passing the refrigerant vapor from the generator chamber through an electromagnetic vapor scrubber which further ionizes and separates the refrigerant vapor;

passing the ionized refrigerant vapor from the scrubber to the condenser which transforms the refrigerant vapor to a refrigerant liquid, the refrigerant liquid leaving the condenser at the same pressure but at a lower temperature than upon entering the compressor;

passing the refrigerant liquid through the metering device which reduces the pressure and temperature of the refrigerant liquid;

passing the refrigerant liquid to the evaporator where a heat exchange medium transfers heat to the refrigerant liquid and transforms the liquid to a vapor in order to achieve a desired cooling effect upon the heat exchange medium;

passing the refrigerant vapor from the evaporator to the absorber which increases the concentration of refrigerant in the absorbent of the absorbent/refrigerant fluid; and recirculating the absorbent/refrigerant fluid to the generator chamber to repeat the cycle.

2. A method for providing a high efficiency absorption refrigeration system comprising the steps of:

circulating an absorbent/refrigerant fluid in a fluid flow loop containing at least a condenser, a metering device, an evaporator, an absorber and a generator chamber;

coupling at least one magnetron to the generator chamber for providing a microwave heat source to increase the temperature of the absorbent/refrigerant fluid being circulated in the fluid flow loop, thereby releasing refrigerant vapor from the absorbent/refrigerant fluid;

mounting at least two electrodes in spaced-apart relation within the generator chamber in contact with the absorbent/refrigerant fluid and energizing the electrodes with an electrical current in order to further facilitate the release of refrigerant vapor from the absorbent/refrigerant fluid within the generator chamber;

passing the refrigerant vapor from the generator chamber through an electromagnetic vapor scrubber which further ionizes and separates the refrigerant vapor;

passing the ionized refrigerant vapor from the scrubber to the condenser which transforms the refrigerant vapor to a refrigerant liquid, the refrigerant liquid leaving the condenser at the same pressure but at a lower temperature than upon entering the compressor;

passing the refrigerant liquid through the metering device which reduces the pressure and temperature of the refrigerant liquid;

passing the refrigerant vapor to the evaporator where a heat exchange medium transfers heat to the refrigerant liquid and transforms the liquid back to a vapor in order to achieve a desired cooling effect upon the heat exchange medium;

passing the refrigerant vapor from the evaporator to the absorber which increases the concentration of refrigerant in the absorbent of the absorbent/refrigerant fluid;

recirculating the absorbent/refrigerant fluid to the generator chamber to repeat the cycle; and wherein the electromagnetic vapor scrubber comprises an electromagnet encircling a portion of the fluid flow loop of the system.

3. The method of claim 2, wherein the absorbent of the absorbent/refrigerant fluid is water.

4. The method of claim 3, wherein the refrigerant of the absorbent/refrigerant fluid is ammonia.

5. The method of claim 2, wherein the fluid loop is provided with a pump means for moving the absorbent/refrigerant fluid around the fluid loop.

6. A method for separating a refrigerant portion from an absorbent portion of an absorbent/refrigerant fluid of the type used in an absorption refrigeration system, the method comprising the steps of:

supplying a source of absorbent/refrigerant fluid to a generator chamber;

supplying microwave energy to the generator chamber to heat the absorbent/refrigerant fluid to a temperature below the boiling point of the refrigerant portion of the absorbent/refrigerant fluid;

mounting at least two spaced-apart electrodes within the generator chamber and ionizing the absorbent/refrigerant fluid in the generator chamber by passing electrical current between the two spaced-apart electrodes, thereby producing a vaporized, predominantly refrigerant portion of the absorbent/refrigerant fluid;

scrubbing and further ionizing the vaporized, predominantly refrigerant portion of the absorbent/refrigerant fluid by passing such portion through a magnetic field having a magnetic resonance frequency matched to the refrigerant portion but not to the absorbent portion.

7. An absorptive refrigeration system, comprising:

at least a generator chamber, a condenser, a metering device, an evaporator, an absorber and an absorbent/refrigerant fluid flowing in a fluid flow loop connected therebetween;

microwave energy means for providing a heat source to increase the temperature of the absorbent/refrigerant fluid being circulated in the fluid flow loop;

ionization means located within the generator chamber for subjecting the absorbent/refrigerant fluid in the generator chamber to an ionizing current in addition to the microwave heat source;

an electromagnetic vapor scrubber located in the fluid flow loop downstream of the generator chamber for further ionizing the fluid;

pump means for moving the absorbent/refrigerant fluid around the fluid flow loop between the generator chamber, condenser, metering device, evaporator and absorber;

wherein the microwave energy means is at least one magnetron type device, wherein the ionization means comprises at least two electrodes mounted in spaced-apart relation within the generator chamber in contact with the absorbent/refrigerant fluid, the ionization means further comprising a power source for energizing the electrodes with an electrical current; and wherein the electromagnetic vapor scrubber comprises an electromagnet encircling a portion of the fluid flow loop of the system.

8. The absorptive refrigeration system of claim 7, wherein the electromagnetic vapor scrubber further comprises a radioactive ring encircling a portion of the fluid flow loop, the radioactive ring containing a source of radioactive material.

9. The absorptive refrigeration system of claim 8, wherein the magnetron type device is mounted on an exterior surface of the generator chamber at an opening provided therein, the magnetron being mounted by means of a lens assembly which includes a frame which contains a glass lens, the assembly also having a wave guide which directs microwave energy emitted by the magnetron type device into the generator chamber.

\* \* \* \* \*